(12) United States Patent
Nakagawa

(10) Patent No.: US 6,317,295 B1
(45) Date of Patent: Nov. 13, 2001

(54) ADJUSTMENT APPARATUS FOR MAGNETIC HEAD DEVICE

(75) Inventor: Masayoshi Nakagawa, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/360,818

(22) Filed: Jul. 26, 1999

(30) Foreign Application Priority Data

Jul. 28, 1998 (JP) .................................................. 10-212351

(51) Int. Cl.⁷ ........................................................ G11B 5/54
(52) U.S. Cl. .......................................................... 360/254.1
(58) Field of Search ............................................ 360/254.1

(56) References Cited

U.S. PATENT DOCUMENTS

| | | |
|---|---|---|
| 4,605,979 | 8/1986 | Inoue et al. ................... 360/254.1 |
| 5,291,361 * | 3/1994 | Yokota .............................. 360/106 |

* cited by examiner

Primary Examiner—David Davis
(74) Attorney, Agent, or Firm—Brinks Hofer Gilson & Lione

(57) ABSTRACT

The supporting member is provided with the leaf spring arms at its upper surface and lower surface, and each of the extremity ends of the arms is provided with each of the magnetic heads. In addition, the lower surface of the arm is provided with the adjusting section. This adjusting section is comprised of a reinforcing leaf spring fixed at its base end to the supporting member and its extremity end is abutted against the lower surface of the arm. In addition, the adjusting screw is arranged at the reinforcing leaf spring and its extremity end is fixed to the supporting member. This adjusting screw is operated to change a resilient force of the reinforcing leaf spring to enable a height position where the magnetic heads and the disc are slid to be adjusted.

13 Claims, 3 Drawing Sheets

ADJUSTMENT APPARATUS FOR MAGNETIC HEAD DEVICE

BACKGROUND OF THE INVENTION

1. Field of the Invention

This invention relates to a magnetic head device in which magnetic heads are slidably brought into contact with a flexible disc to read data from the disc or write data into the disc, and more particularly a magnetic head device in which the disc can be held stably by an upper magnetic head and a lower magnetic head.

2. Description of the Related Art

FIG. 7 is a side view for showing a magnetic head device 50 of the prior art.

The magnetic head device 50 shown in FIG. 7 is used in a low capacity type floppy disc device and as medium in this case a flexible disc is used.

In the aforesaid magnetic disc device 50 shown in FIG. 7, a supporting member 52 is arranged on a chassis 51. The aforesaid supporting member 52 is inserted into and guided by a guide shaft (not shown) which is arranged to face toward a radial direction of a disc D. There is also provided a driving section not shown, the supporting member 52 is guided on the guide shaft under a driving force of the driving section and moved toward a radial direction of the disc D.

A fixed arm 53 extending from the bottom part of the supporting member 52 toward the disc D is integrally formed with the supporting member 52, the fixed arm 53 can be slid at the lower surface side of the disc D, and there is provided a magnetic head 58 of a side 0 at an upper surface of the extremity end of the fixed arm 53.

In addition, the supporting member 52 is provided with a supporting arm 54 at a position opposite to the fixed arm 53, the base end of the supporting arm 54 is connected to a leaf spring 55 and the base end of the leaf spring 55 is fixed to the supporting member 52 by a screw 57. Further, the extremity end of the supporting arm 54 is provided with a magnetic head 59 of the side 1 at a position opposite to the magnetic head 58.

The leaf spring 55 is provided with a helical coil spring 56 at its upper part and the supporting arm 54 is always biased by the helical coil spring 56 toward the direction of the disc D. Additionally, this magnetic head device 50 is provided with a retracting mechanism (not shown) for retracting the magnetic head 59 above the disc D when the disc D is not loaded.

However, as a high density (a high volume) of the disc D was required, the disc D had to be rotated while its rotating speed was increased more than that of the prior art, resulting in that the prior art magnetic head device 50 had the following problem.

That is, in the case of the magnetic head device 50, the motion of the magnetic head 58 at the side 0 in its direction of height is restricted. Due to this fact, when the disc D is rotated at a high speed, if there is a certain difference between an access plane of the disc D and the magnetic heads 58, 59 in a direction of height, a strain may occur at the disc D by its own inertia. With such an arrangement as above, the magnetic heads 58, 59 could not follow the deformation of the disc D, resulting in that there was a possibility that a certain off-track state was produced, reading-in or writing-in of data into the disc failed or the disc D was damaged.

In view of the foregoing, the magnetic head device 60 as shown in FIG. 8 has been provided in which the magnetic head can follow against the deformation of the disc D.

The magnetic head device 60 shown in FIG. 8 is a mechanism in which each of both upper and lower magnetic heads 64, 65 at the side 0 and at the side 1 in respect to the supporting member 61 is supported by each of leaf spring arms 62, 63, respectively. In the magnetic head device 60 shown in FIG. 8, if the disc D is rotated at a high speed, it becomes possible to cause the magnetic heads 64, 65 to follow the disc D.

On the contrary, since the upper and lower magnetic heads 64, 65 are supported together by the leaf spring arms 62, 63, press contacted points of the magnetic heads 64, 65 with the disc D may easily be displaced in their positions in either upward or downward direction in respect to an installing reference position of the disc D due to an unbalanced biasing force of each of the upper and lower arms 62, 63.

When the press contacted points of the upper and lower magnetic heads 64, 65 with the disc D are displaced in an upward or downward direction in respect to the disc D, any one of the magnetic heads is forcedly brought into contact with a recording surface of the disc D, an excessive frictional force is imparted upon the recording surface of the disc D or the magnetic heads. The result is that the recording surface of the disc or the sliding surface of each of the magnetic heads may easily be damaged.

Further, the disc is also deformed, the leaf spring arms 62, 63 for supporting the magnetic heads 64, 65 under repelling force attained from the deformation may easily be deformed under a specified period, resulting in that the arms 62, 63 and the magnetic heads 64, 65 may easily generate vibration S.

In the case that an amplitude of this vibration S is high, a displacement is generated between the disc D and each of the magnetic heads 64, 65 in respect to the radial direction of the disc D (a track direction), resulting in that an off-track state may easily be produced.

In reference to the foregoing arrangement, in the case of the magnetic head device 60 above, the resilient forces of the arms 62, 63 supporting the magnetic heads 64, 65 are measured individually and it becomes necessary to select each of the arms 62, 63 and combine them in such a way that the resilient forces of the upper and lower arms 62, 63 may be well balanced and its manufacturing work becomes quite complicated.

SUMMARY OF THE INVENTION

The present invention has been completed in order to solve the aforesaid problems found in the prior art and it is an object of the present invention to provide a magnetic head device in which a balance in a height direction of an upper magnetic head and a lower magnetic head can be easily adjusted, a vibration of each of the magnetic heads in its height direction can be easily adjusted, a vibration of each of the magnetic heads in its height direction can be absorbed and then an occurrence of an off-track state can be prevented.

The present invention provides a magnetic head device comprised of a flexible disc; magnetic heads arranged at both surfaces of the disc so as to perform either a recording or a reproducing of data while the magnetic heads are being slidably contacted with the disc surfaces; a pair of arms capable of being moved up and down, supporting each of the aforesaid magnetic heads at their extremity ends and realizing a biasing force for resiliently pressing the magnetic heads against the disc; and a supporting member for supporting the base ends of the arms characterized in that there is provided adjusting means in which at least one of the arms is pushed to adjust a height of the arm in its vertical direction.

The arrangement of the adjustment means described above enables a relative height between the press contacting points of the upper and lower magnetic heads and the disc to be easily adjusted, eliminates a necessity for performing a selective combination of the upper and lower arms, enables any optional extracted component parts to be assembled and used, enables a useless application of the component parts to be eliminated and also attains its cost-down. In addition, it becomes possible to manufacture the device in a short period of time and it can be adapted for various kinds of media.

Although the arms are formed by metallic or resin leaf springs, the arms are formed by a rigid member, their base ends are supported by the leaf springs, the magnetic heads are biased against the disc by resilient forces of the leaf springs or the rigid arms are biased by a helical coil spring or the like arranged outside the arms and both the upper magnetic head and the lower magnetic head are resiliently brought into contact with the disc by the upper arm and the lower arm.

In addition, in the present invention, it is preferable that the height adjustment means is comprised of a reinforcing leaf spring supported by the supporting member at its base end and abutted against one surface of the arm at its extremity end and of an adjustment member for changing a resilient force of the reinforcing leaf spring.

For example, the base part of the reinforcing leaf spring is fixed to either an upper surface or a lower surface of the supporting member, only the extremity end of it is abutted against the arm and an adjustment member such as a screw or the like arranged at the reinforcing leaf spring is adjusted to cause the resilient force of the reinforcing leaf spring to be changed. At this time, a clearance is provided between the supporting member and the reinforcing leaf spring so as to enable a resilient force of the reinforcing leaf spring to be changed under an adjustment of the adjusting member, thereby the reinforcing leaf spring can be deformed in a vertical direction through adjustment of the adjusting member and it is possible to adjust a position of the arm in its height direction to which the extremity end of the reinforcing leaf spring is abutted. In this case, the reinforcing leaf spring and an arm are assembled at the time of their manufacturing process in such a way that a biasing force by the arm arranged at a side opposite to the side where the reinforcing leaf spring is fixed becomes large, a positional adjustment of the press contacted point of the magnetic head in a vertical direction can be carried out only by adjustment of the adjusting member arranged at the reinforcing leaf spring in one direction after assembling the upper and lower magnetic heads, for example, only by a rotation of the adjusting member in one direction in which the adjusting screw acting as the adjusting member is threaded into the supporting member when the adjusting screw is used.

Further, it is preferable that the abutted section between the arm and the reinforcing leaf spring is provided with either fluid or gel of high viscosity which can be slid at the abutted section.

Even in the case that a vibration in a vertical direction is generated at the magnetic heads while the disc is being rotated at a high speed, a certain sliding state occurs at the abutted section between the arm and the reinforcing leaf spring, thereby the aforesaid vibration can be attenuated and further an off-track state generated by the vibration can be restricted.

In addition, it is preferable that arrangement of either the aforesaid fluid or gel having a high viscosity at the abutted section in either the arm or the reinforcing leaf spring enables vibration to be absorbed without damaging the sliding characteristic.

DESCRIPTION OF THE PREFERRED EMBODIMENTS

Figure 1:
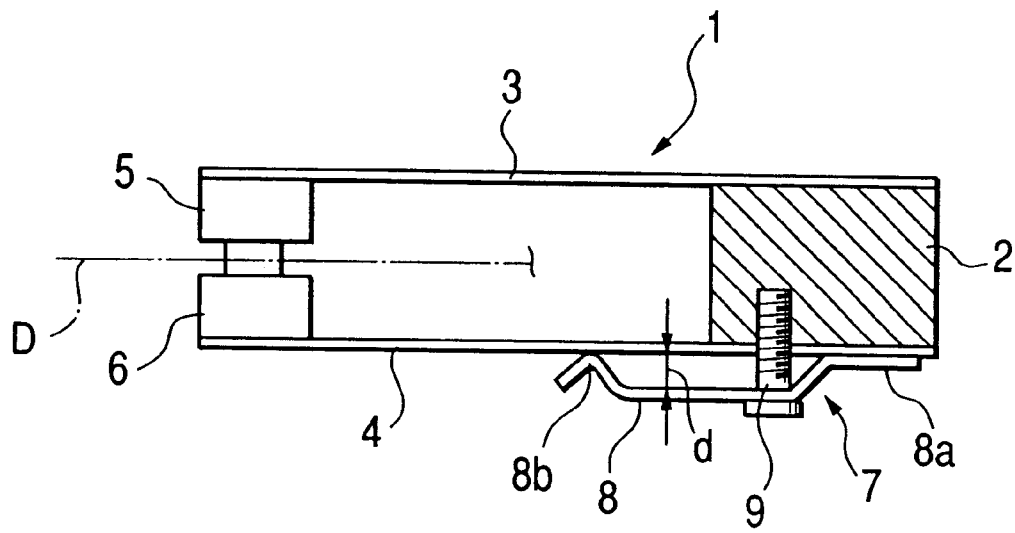
FIG. 1 is a sectional view for showing a magnetic head device of the present invention.
Figure 2:
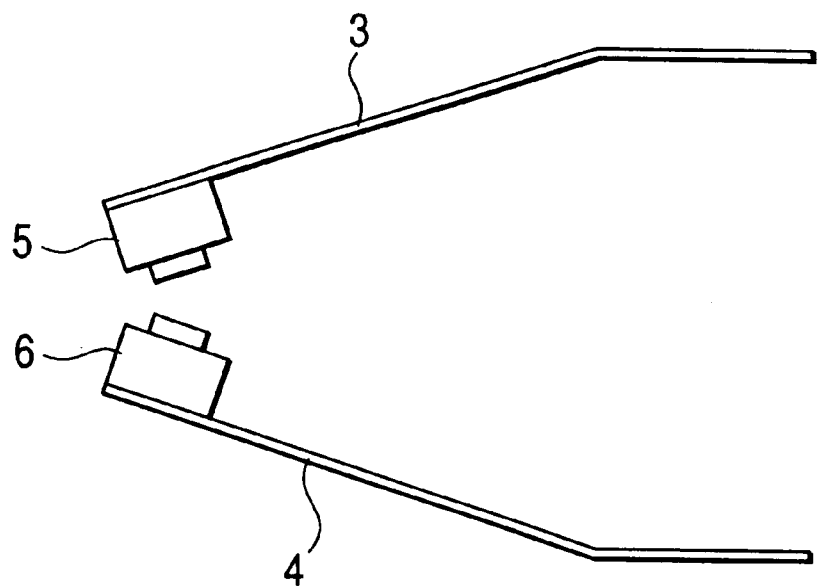
FIG. 2 is a side view for showing a shape of an arm before its fixing state.
Figure 3:
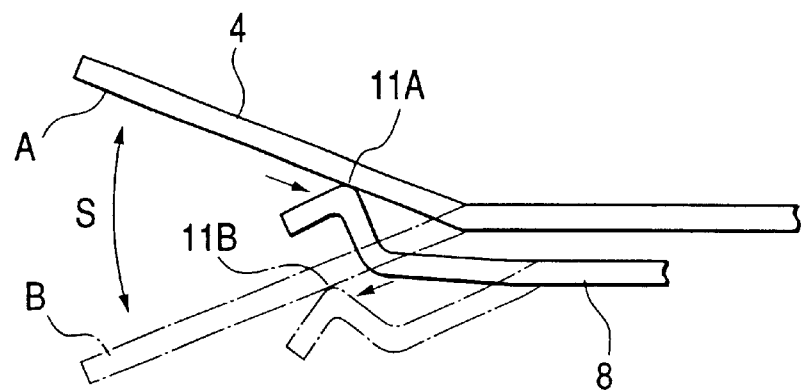
FIG. 3 is an illustration for showing an effect of absorbing vibration.
Figure 4:
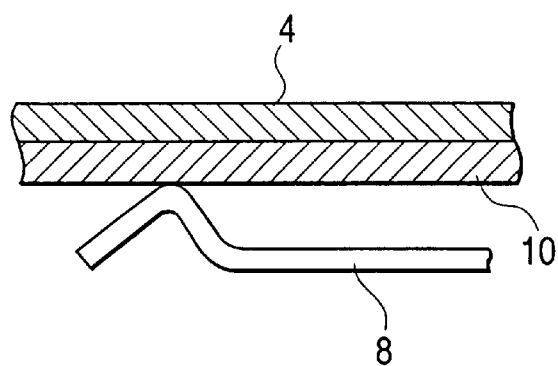
FIG. 4 is an enlarged sectional view for showing an abutted part between an arm and a reinforcing leaf spring.
Figure 5:
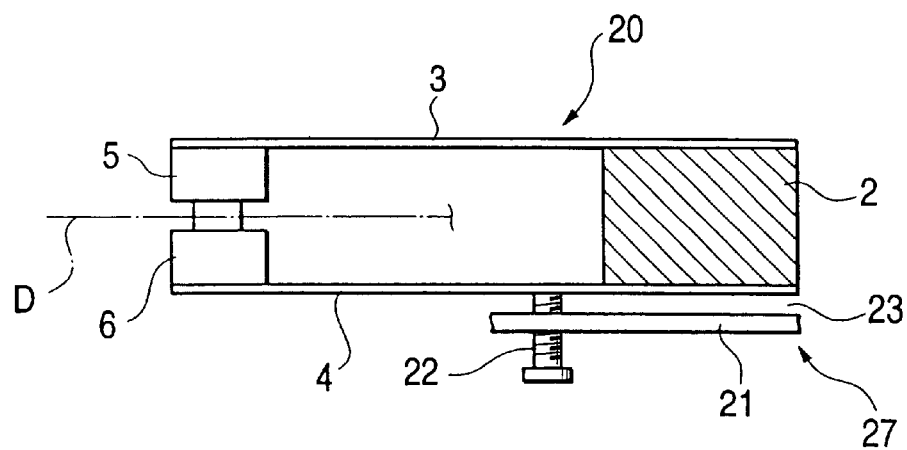
FIG. 5 is a side view for showing another magnetic head device of the present invention.
Figure 6:
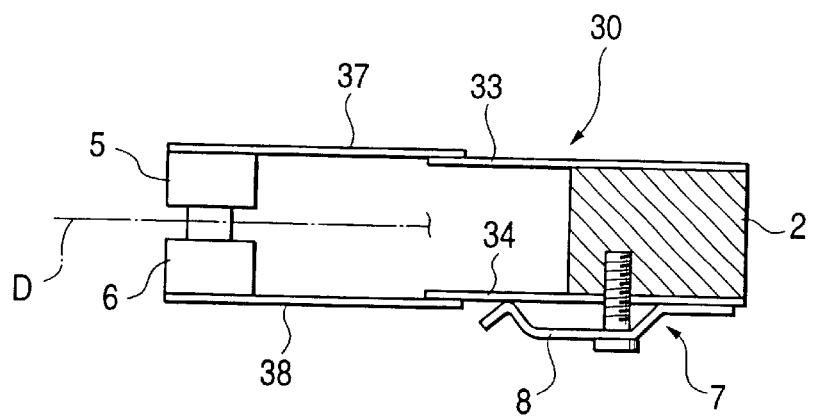
FIG. 6 is a sectional view for showing a still further magnetic head device of the present invention.
Figure 7:
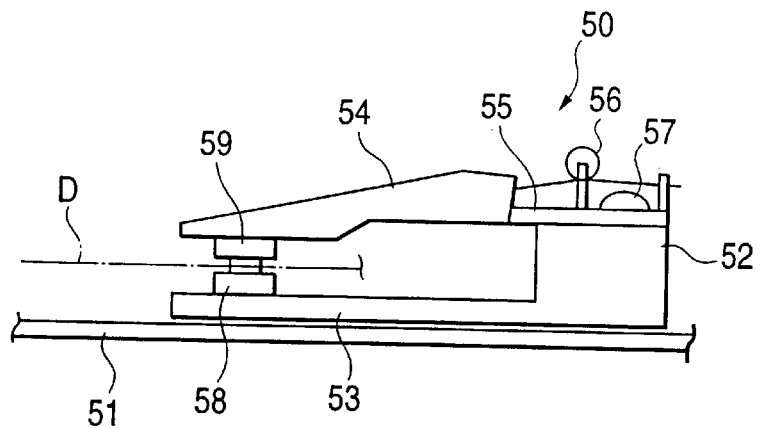
FIG. 7 is a side view for showing a magnetic head device of the prior art.
Figure 8:
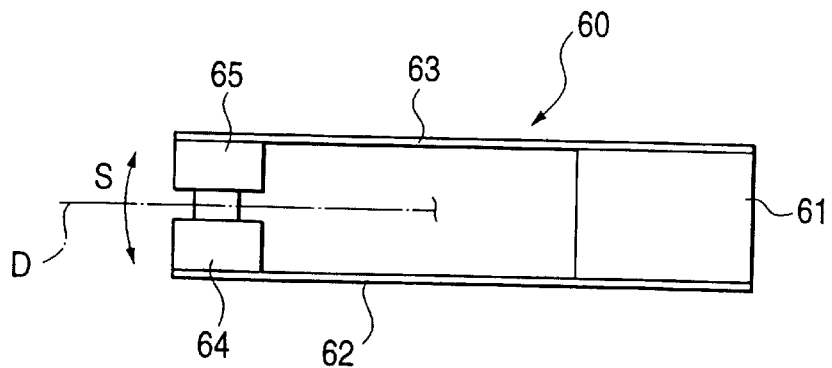
FIG. 8 is a side view for showing another magnetic head device of the prior art.

Referring now to the drawings, the magnetic head device of the present invention will be described as follows. FIG. 1 is a sectional view for showing the magnetic head device of the present invention. FIG. 2 is a side view for showing a shape of an arm before its fixing state. FIG. 3 is an illustration for showing an effect of absorbing vibration. FIG. 4 is an enlarged sectional view for showing an abutted part between an arm and a reinforcing leaf spring. FIG. 5 and FIG. 6 are sectional views for showing a modification of the magnetic head device of the present invention, respectively.

The magnetic head device 1 shown in FIG. 1 is comprised of a supporting member 2, arms 3, 4 entirely formed by a leaf spring of metal or resin and magnetic heads 5, 6. There is provided an adjusting section 7 acting as an adjustment means for use in adjusting the height of each of the magnetic heads 5, 6.

Each of the arms 3, 4 is attached at its base end to the upper surface and the bottom surface of the supporting member 2 and fixed to the surfaces by screws or the like. The extremity ends of the arms 3, 4 are faced toward the disc D and further the extremity ends of the arms 3, 4 are provided with magnetic heads 5, 6 at their opposing surfaces.

As shown in FIG. 2, the arms 3, 4 have a doglegged shape fixed to the supporting member 2, and in the case that the arms 3, 4 having such a shape as described above are fixed to the supporting member 2, they are pushed from each other at the extremity ends of the magnetic heads 5, 6. In addition, the arms 3, 4 are formed in such a shape as one in which they may be deformed in a vertical direction so as to enable the magnetic heads 5, 6 to follow a deformation of the disc D under its rotation. In addition, it is acceptable for the entire arms 3, 4 not to be formed by the same resilient member such as metal or the like, portions of the arms near the supporting member 2 are formed by a resilient member and portions of the arms near the extremity ends are formed by a member of high rigidity such as resin or the like.

To the lower arm 4 is fixed the adjustment section 7 capable of adjusting a height of each of the magnetic heads 5, 6.

The adjustment section 7 is provided with a reinforcing leaf spring 8 having a resilient force, a base end 8a of the reinforcing leaf spring 8 is fixed to the supporting member 2 side and an extremity end 8b is abutted against one surface of the arm 4. Portions other than the base end 8a and the extremity end 8b are formed into such a shape as one spaced apart by a distance d from the arm 4. In addition, at the extremity end 8b, the reinforcing leaf spring 8 is bent into a mountain-shape and a top point of the mountain-shape is abutted against the lower surface of the arm 4.

At the reinforcing leaf spring 8, an adjustment screw 9 acting as an adjusting member passes through the reinforcing leaf spring 8, the adjustment screw 9 is threaded into the supporting member 2 and fixed to it.

In accordance with the adjustment section 7, if the press contacted points of the magnetic heads 5, 6 are displaced downwardly in respect to an installing reference plane of the disc D, the adjustment screw 9 is threaded into the supporting member 2, thereby a resilient force of the reinforcing leaf spring 8 is changed and the abutting point of the extremity end 8b of the reinforcing leaf spring 8 pushes against the lower surface of the arm 4. With such an arrangement as above, it is possible to adjust a height position between each of the magnetic heads 5, 6 and the disc D.

In this case, it is preferable that the arm 3 having the magnetic head 5 arranged therein with its spring pressure being set to be higher than a spring pressure of the arm 4 is selected, assembled and constituted such that the press contacted points of the magnetic heads 5, 6 are always positioned lower than the installing reference plane of the disc D. In the case that a contacted position between each of the magnetic heads 5, 6 and the disc D is adjusted, this adjustment can be carried out by rotating the adjusting screw 9 only in one direction under a previously setting state as described above.

Further, the adjusting section 7 may be fixed not only at a bottom surface (a side of the side 0) but also at the upper surface (a side of the side 1). In the case that the adjusting section 7 is fixed to the upper surface side, it is desirable that a spring pressure at the arm 4 in the side 0 is set to be stronger than that of the arm 3 in the side 1 and the press contacted points of the magnetic heads 5, 6 are positioned at a higher location than the installing reference plane of the disc D. Under this above arrangement when the contacted position between each of the magnetic heads 5, 6 and the disc D is adjusted, the adjustment can be carried out only through a rotation of the adjusting screw 9 in one direction opposite to the aforesaid direction.

Although in the case wherein the magnetic head device 1 is formed as described above, the disc D is held by the magnetic head 5 and the magnetic head 6 and the magnetic heads slide on both surfaces of the disc D. At this time, there is no possibility that the disc D is forcedly deformed into any one of the upward or downward direction by the upper magnetic head 5 and the lower magnetic head 6.

Further, in the case that there occurs a surface vibration such as a distortion of the disc D, an upward or downward vibration S is produced at each of the magnetic heads 5 and 6. As shown in FIG. 3, in the case that the arm 4 is vibrated from its horizontal state to the state A, a contacted point 11A between the arm 4 and the reinforcing leaf spring 8 is slid on the arm 4 toward the base end (a direction of arrow) more than the contacted point at its horizontal state. In addition, in the case that the arm 4 is oscillated to a state B, a contacted point 11B between the arm 4 and the reinforcing leaf spring 8 is slid on the arm 4 toward the extremity end (a direction of arrow) more than the contacted point at its horizontal state. The repetitive reciprocating motion of the arm 4 from the state A to the state B as described above may always produce a frictional force between the reinforcing leaf spring 8 and the arm 4 and this frictional force may act to attenuate an upward or downward oscillation of the arm 4.

Further, as shown in FIG. 4, it is preferable that a vibration absorbing layer 10 composed of fluid or gel having a high viscosity is arranged at a location where the reinforcing leaf spring 8 is slid on one surface (lower surface) of the arm 4. It is also preferable that fluid or gel having a high viscosity may be applied at the sliding portion. As the aforesaid fluid or gel having a high viscosity, oil having a high viscosity (such as grease) or the like is used and arrangement of this vibration absorbing layer 10 enables a realization of an effect of absorbing vibration and attenuating it without damaging a sliding characteristic between the arm 4 and the reinforcing leaf spring 8.

Additionally, it may also be applicable that the reinforcing leaf spring 8 is provided with the vibration absorbing layer 10 not damaging sliding characteristic with the arm 4, capable of absorbing vibration and attenuating it. In addition, it is also applicable that the reinforcing leaf spring 8 itself is formed by material quality which can be slid and absorb vibration.

FIG. 5 is a side view for showing a modification of the magnetic head device 20 of the present invention. In this case, the magnetic head device 20 is constructed such that the supporting member 2, the arms 3, 4 and the magnetic heads 5, 6 are formed in the same manner as that of the aforesaid magnetic head device 1.

As shown in FIG. 5, an adjusting member 27 is arranged at a lower side of the supporting member 2, the adjusting member 27 is provided with a flat plate-like reinforcing leaf spring 21 extending from the base end of the arm 4 to the extremity end of the arm 4, and further a height adjustment clearance 23 is provided between the arm 4 and the reinforcing leaf spring 21. Further, an adjusting screw 22 is fixed to the extremity end of the reinforcing leaf spring 21 and threaded into it until it abutes against the arm 4.

With the aforesaid adjusting member 27, it is possible to adjust the height position of the press contacted points between each of the magnetic heads 5, 6 and the disc D. For example, in the case that the height positions formed between each of the magnetic heads 5, 6 and the disc D are lower than an allowable range (a range where a normal operation is carried out), the adjusting screw 22 is threaded into the reinforcing leaf spring to cause the arm 4 to move upwardly, thereby it can be adjusted to the target height.

In addition, in the case of the aforesaid magnetic head device 20, a vibration absorbing layer composed of fluid or gel having a high viscosity which is similar to that applied in the aforesaid magnetic head device 1 can be arranged at the extremity end of the adjusting screw 22 or at the arm 4 side. With such an arrangement as above, the arm 4 and the adjusting screw 22 are slid from each other to enable vibration of the magnetic heads 5, 6 in their vertical direction generated under a high speed rotation of the disc D to be absorbed. In this case, it may also be applicable that the extremity end portion of the adjusting screw 22 is formed into a spherical shape in order to improve a sliding contact between the arm 4 and the adjusting screw 22.

FIG. 6 is a sectional view for illustrating a still further modification of the magnetic head device of the present invention.

The magnetic head device 20 is constructed such that the supporting member 2, the magnetic heads 5, 6 and the adjusting section 7 are formed in the same manner as that of the aforesaid magnetic head device 1.

In the magnetic head device 30, each of the upper surface and the lower surface of the supporting member 2 is provided with each of leaf springs 33, 34, respectively. To the extremity ends of the leaf springs 33, 34 are connected the supporting arms 37, 38 made of resin having no resiliency at all and the extremity ends of the arms are provided with the magnetic heads 5, 6. Further, the adjusting section 7 is fixed to the lower surface of the supporting member 2 and the extremity end of the reinforcing leaf spring 8 of the adjusting section 7 is abutted against one surface (lower surface) of the leaf spring 34. In addition, the connection between the leaf springs 33, 34 and the supporting arms 37, 38 may be carried out using adhesive agent or the like, the supporting arms 37, 38 are formed with grooves into which the leaf springs 33, 34 can be inserted, the leaf springs 33, 34 may be inserted into and fixed to them.

Further, either the leaf spring 34 or the reinforcing leaf spring 8 may be provided with a vibration absorbing layer composed of fluid or gel having a high viscosity similar to that of the aforesaid device at a location where they are slid from each other, or either fluid or gel having a high viscosity is coated at their sliding sections to enable vibration to be absorbed. In this case, adjustment of the magnetic heads 5, 6 in their height direction is similar to that of the aforesaid magnetic head device 1.

Forming of the device as described above enables the vibration generated under a rotation of the disc D to be attenuated under sliding action between the leaf spring 34 and the reinforcing leaf spring 8 as well as an action of the vibration absorbing layer.

Further, the aforesaid magnetic head devices 1, 20 and 30 are provided with a head retracting mechanism (not shown) and in the case that the disc D is not inserted into the device, the magnetic heads can be retracted in an upward or downward direction of the disc D.

The magnetic head device of the present invention is not limited to the aforesaid preferred embodiments and its various kinds of modifications, for example, a shape of the reinforcing leaf spring and a fixing position of the adjusting member or the like, can be attained within a scope of the present invention not changing its gist.

What is claimed is:

1. A magnetic head device comprising:
   a flexible disc;
   magnetic heads arranged at both surfaces of said disc so as to perform either a recording or a reproducing of data while said magnetic heads are being slidably brought into contact with the disc surfaces;
   a pair of arms capable of being moved up and down and supporting each of said magnetic heads at their extremity ends and realizing a biasing force for resiliently pressing said magnetic heads against the disc; and
   a supporting member for supporting a base end of each of said arms,
   wherein there is provided a height adjusting apparatus for adjusting the position of at least one of said arms in an upward or downward direction so as to alter the distance or biasing force between the magnetic heads and the disc, said height adjusting apparatus comprising a reinforcing leaf spring having a base end that is supported by said supporting member and an extremity end that is abutted against a surface of said arm, said height adjusting apparatus further comprising an adjusting screw connecting the reinforcing leaf spring to the support member, wherein the adjusting screw is turned to change the resilient force of the reinforcing leaf spring.

2. A magnetic head device according to claim 1, wherein an abutting section between said arm and said reinforcing leaf spring is provided with either a fluid or a gel having a high viscosity to alter the frictional sliding force between said arm and said reinforcing leaf spring at said abutting section.

3. A magnetic head device according to claim 1, wherein each of the pair of arms is formed by a leaf spring.

4. A magnetic head device according to claim 1, wherein each of the pair of arms is formed of a composite structure, said composite structure having a high rigidity portion near the extremity end of the arm and a resilient portion near the base end of the arm.

5. A magnetic head device according to claim 1, wherein the extremity end of the reinforcing leaf spring is bent into a mountain-shape, wherein a top point of the mountain-shape is abutted against the surface of said arm.

6. A magnetic head device comprising:
   a flexible disc;
   magnetic heads arranged at both surfaces of said disc so as to perform either a recording or a reproducing of data while said magnetic heads are being slidably brought into contact with the disc surfaces;
   a pair of arms capable of being moved up and down and supporting each of said magnetic heads at their extremity ends and realizing a biasing force for resiliently pressing said magnetic heads against the disc; and
   a supporting member for supporting a base end of each of said arms,
   wherein there is provided a height adjusting apparatus for adjusting the position of at least one of said arms in an upward or downward direction so as to alter the distance or biasing force between the magnetic heads and the disc, said height adjusting apparatus comprising a reinforcing leaf spring having a base end that is supported by said supporting member and an extremity end that is extended adjacent to a surface of said arm, said height adjusting apparatus further comprising an adjusting screw passing through said reinforcing leaf spring and abutting against the surface of the arm, wherein the adjusting screw is turned to change the resilient force of the reinforcing leaf spring.

7. A magnetic head device according to claim 6, wherein the adjusting screw comprises an end having a spherical shape.

8. A magnetic head device according to claim 6, wherein each of the pair of arms is formed by a leaf spring.

9. A magnetic head device according to claim 6, wherein each of the pair of arms is formed of a composite structure, said composite structure having a high rigidity portion near the extremity end of the arm and a resilient portion near the base end of the arm.

10. A magnetic head device according to claim 6, wherein a vibration absorbing layer is formed between the adjusting screw and the surface of the arm.

11. A magnetic head device comprising:
    a flexible disc;
    magnetic heads arranged at both surfaces of said disc so as to perform either a recording or a reproducing of data while said magnetic heads are being slidably brought into contact with the disc surfaces;
    a pair of arms capable of being moved up and down and supporting each of said magnetic heads at their extremity ends and realizing a biasing force for resiliently pressing said magnetic heads against the disc, each of said arms being formed of a composite structure having a high rigidity portion near the extremity end of the arm and a resilient portion near a base end of the arm; and a supporting member for supporting the base end of each of said arms, wherein there is provided a height adjusting apparatus for adjusting the position of at least one of said arms in an upward or downward direction so as to alter the distance or biasing force between the magnetic heads and the disc, said height adjusting apparatus comprising a reinforcing leaf spring having a base end that is supported by said supporting member and an extremity end that is abutted against a surface of said arm, said height adjusting apparatus further comprising an adjusting screw connecting the reinforcing leaf spring to the support member, wherein the adjusting screw is turned to change the resilient force of the reinforcing leaf spring.

12. A magnetic head device according to claim 11, wherein an abutting section between said arm and said reinforcing leaf spring is provided with either a fluid or a gel having a high viscosity to alter the frictional sliding force between said arm and said reinforcing leaf spring at said abutting section.

13. A magnetic head device according to claim 11, wherein the extremity end of the reinforcing leaf spring is bent into a mountain-shape, wherein a top point of the mountain-shape is abutted against the surface of said arm.

* * * * *